Patented Jan. 2, 1923.

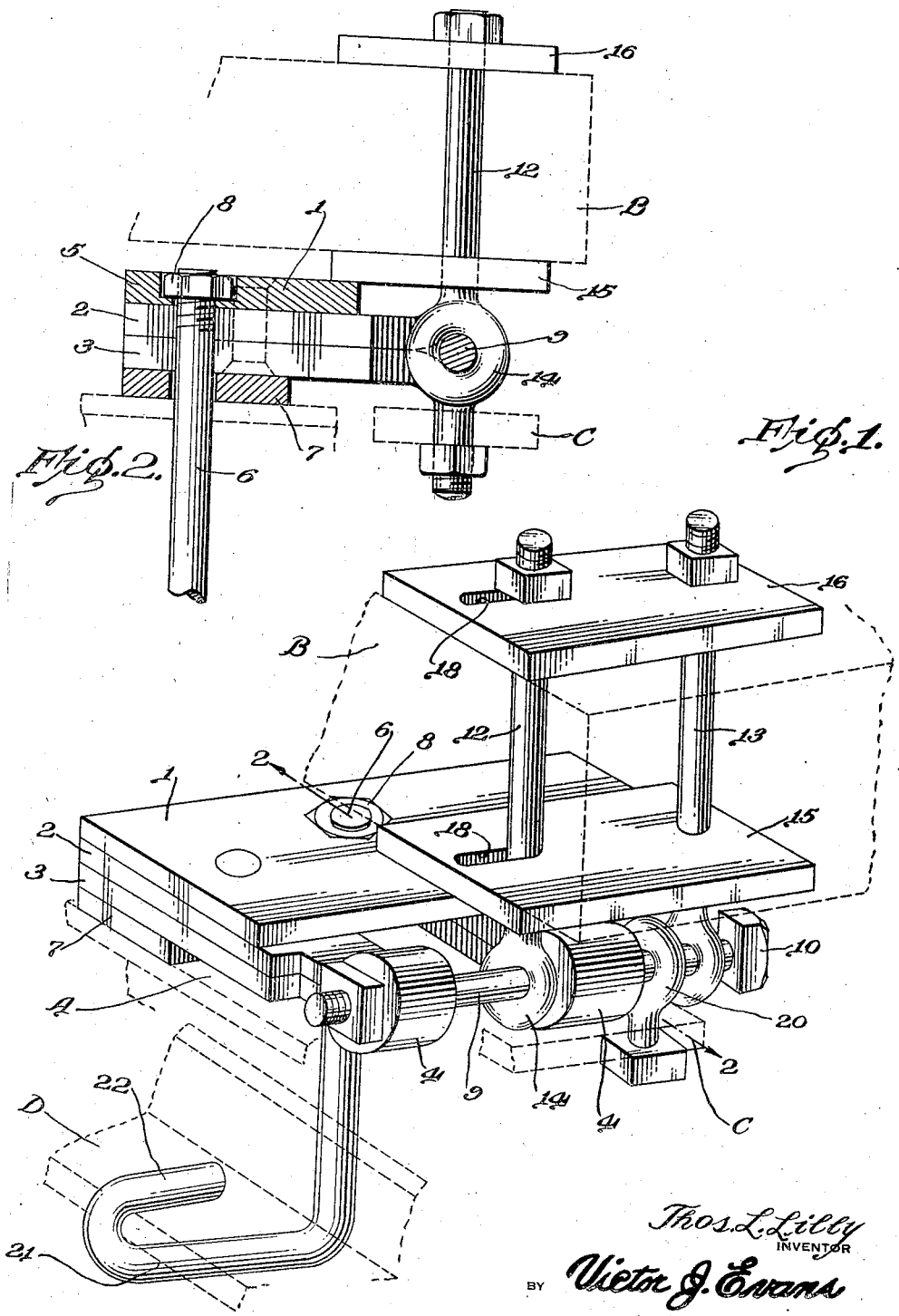

1,441,159

UNITED STATES PATENT OFFICE.

THOMAS L. LILLY, OF MINONK, ILLINOIS.

HINGE.

Application filed November 25, 1921. Serial No. 517,565.

*To all whom it may concern:*

Be it known that I, THOMAS L. LILLY, a citizen of the United States, residing at Minonk, in the county of Woodford and State of Illinois, have invented new and useful Improvements in Hinges, of which the following is a specification.

This invention relates to hinges and more particularly to hinges designed for use in hingedly connecting the rear end of a body or bed to the chassis of a truck or motor vehicle structure to permit the bed to be converted into an automobile bed structure.

Another object of this invention is to provide a hinge structure which is particularly designed for use on Ford motor trucks but which may be used on any type of motor truck for converting it into a dump body type, and one which may be attached to the truck chassis and body without requiring alterations to either the truck body or chassis and will further hingedly support the truck body in an efficient firm manner.

Other objects of the invention will appear in the following detailed description taken in connection with the accompanying drawings wherein:

Fig. 1 is a perspective view of the improved hinge structure showing it applied.

Fig. 2 is a section taken on the line 2—2 of Fig. 1.

Referring more particularly to the drawings, the improved hinge structure comprises a main attaching and supporting plate structure 1 which is built up of a plurality of abutting sections as clearly shown in Figs. 1 and 2 of the drawings. The central sections 2 and 3 are preferably formed of a single piece of metal and have eyes 4 formed on their outer ends which eyes are reduced in width relative to the sections 2 and 3. Each pair of the sections 2 and 3 are connected by the top section or plate 5 which is riveted or otherwise suitably connected to the sections 2 and 3. The entire attaching or supporting structure 1 is adapted to attachment to the angle irons A on the chassis of a motor vehicle by means of bolts 6 which extend through aligning openings in the top plate or section 5 and the lowermost plate or section 7 and between the facing edges of the pairs of sections 2 and 3. The nut 8 which is mounted upon the bolt 6 is preferably countersunk in the top plate or section 5.

A cross rod or bolt 9 is rotatably supported by the eyes 4 and it has a head 10 formed on one end and a nut 11 mounted upon the other end to limit longitudinal movement of the bolt relative to the eyes 4. A pair of eye bolts 12 and 13 are mounted upon the bolt 9 for sliding movement thereon, by means of the eyes 14, and the bolts 12 and 13 extends upwardly through binding plates 15 and 16 which are adapted to engage upon opposite sides of the sill B of the vehicle body. The binding plates 15 and 16 are provided with slots 18 through which the bolt 12 extends to permit adjustment of the bolt 12 along the bolt 9 to permit proper engagement of the bolts 12 and 13 with the sill B. The bolt 9 which serves as the pintle of the hinge structure is anchored to the chassis of the vehicle by means of a relatively short eye bolt 20, the shank of which extends through the lip C on the rear end of the chassis of the vehicle. This lip C is made on all standard "Ford" chassis so that the chassis does not require alteration to permit adjustment of the hinge thereto. The bolts 12 and 13 and the bolt 20 are slidably mounted upon the pintle bolt 9 so that they may be adjusted longitudinally on the pintle bolt as necessary.

The bolt 6 has a horizontally positioned hook structure 21 formed upon its lower end the bill 22 of which engages the upper surface of the angle iron side rail of the chassis of the vehicle as clearly shown in Fig. 1 of the drawings, to facilitate the firm anchoring of the hinge structure.

It is to be understood that the bolt 13 is removably mounted upon the bolt 9 and may be reversed or its position changed thereon so as to place the eye of the said bolt between the nut on the end of the bolt 9 and the adjacent bearing 4 for reversing the relative positions of the bolts 12 and 13 to accommodate the hinge structure to truck bodies of different types, and it is further to be understood that the head 10 of the bolt 9 is to be clamped tightly against the eye of the bolt 13 or the eye of the bolt 20, when the hinge is in place on a truck body for preventing wabbling of the relative portions of the hinge.

When a vehicle body or bed with which the improved hinge is associated is in a dumping position the eyes 4 serve as bearings for the lower binding plate 15 and carry the load at such times.

It is to be understood that a pair of these hinges are attached to the rear end of the vehicle bed and to the rear end of the chassis to permit the bed to be moved upon the pintle bolts 9 as axes to provide a dumping bed or body for the vehicle preferably of the light truck type, and that any suitable type of hoist mechanisms (not shown) is to be utilized for raising the forward end of the truck.

It is, of course, to be understood that the invention may be constructed in other manners and the parts associated in other manners and, therefore, I do not desire to be limited in any manner except as set forth in the claims hereunto appended.

Having thus described my invention what I claim is:

1. In a hinge as specified, a pintle bolt, supports therefor, an eye bolt slidably mounted upon said pintle bolt and adapted for connection with a vehicle chassis, and a pair of eye bolts slidably mounted upon said pintle bolt and adapted for connection with the vehicle body, clamping plates mounted upon said last named eye bolts and adapted for clamping engagement upon opposite sides of the sill of a vehicle body.

2. In a hinge as specified, a pintle bolt, supports therefor, an eye bolt slidably mounted upon said pintle bolt and adapted for connection with a vehicle chassis, and a pair of eye bolts slidably mounted upon said pintle bolt, clamping plates mounted upon said last named eye bolts and adapted for clamping engagement upon opposite sides of the sill of a vehicle body, and an anchoring bolt extending through said pintle bolt supports and having a substantially horizontally positioned hook on its lower end for engagement with a vehicle chassis.

In testimony whereof I affix my signature.

THOMAS L. LILLY.